Nov. 19, 1929.  R. PUDELKO  1,736,090
DEVICE FOR INDICATING APPARENT ENERGY CONSUMPTION
Filed Oct. 22, 1924
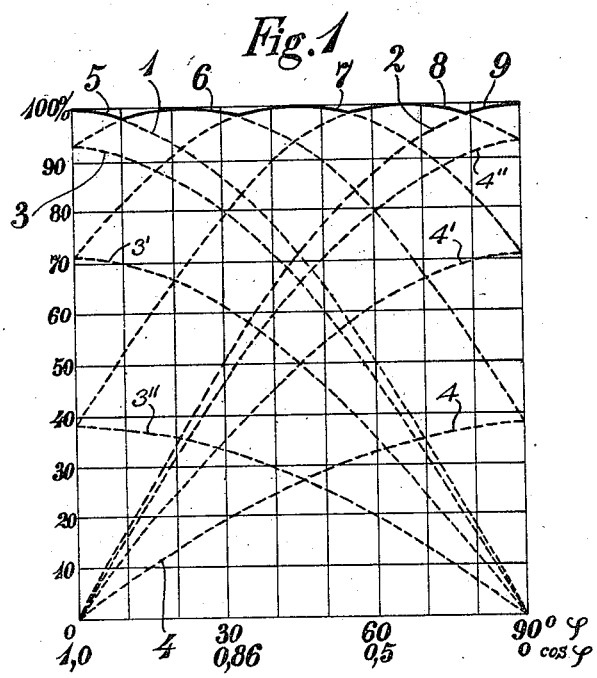
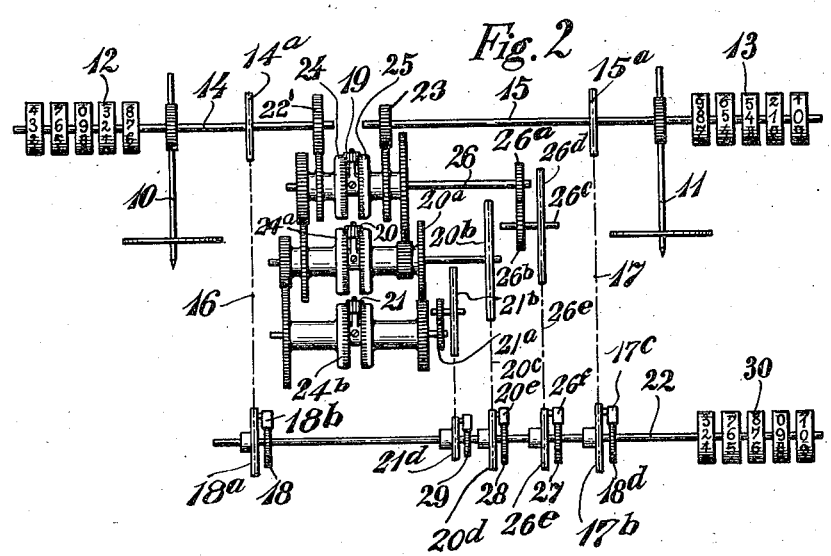
Inventor:
Riccard Pudelko
By B. Singer Atty.

Patented Nov. 19, 1929

1,736,090

UNITED STATES PATENT OFFICE

RICCARD PUDELKO, OF ZUG, SWITZERLAND, ASSIGNOR TO LANDIS & GYR A.-G., OF ZUG, SWITZERLAND, A SWISS FIRM

DEVICE FOR INDICATING APPARENT ENERGY CONSUMPTION

Application filed October 22, 1924, Serial No. 745,248, and in Switzerland November 9, 1923.

The invention relates to a novel and useful method and mechanism for measuring the apparent energy consumption in single and polyphase circuits.

My invention comprises a method and devices for employing a plurality of single phase or polyphase meter elements, there being at least two of such elements, these meter elements being each continuously responsive in their speed to all the variations of power factor in the circuit. This responsiveness is effected by providing for one of these meter elements a phase displacement between the active series fields and the shunt fields different from the angle of phase displacement between these two active fields of the other meter element. It is practicable to provide or predetermine speeds for each of these continuously responsive meter elements for different or varying power factors, which speeds are so proportioned or related to each other that their algebraic sum will always be of approximately the same value, whereby there will be always registered the apparent energy supplied. In the present preferred embodiment I employ a watt hour meter and a reactive or wattless component meter for the purposes and in the relation just described.

The periodic speeds of these continuously responsive meter elements are related to each other in the sine and cosine sense of the angle of phase displacement, and have the characteristic that their combined value at or near their respective maximum speeds is practically constant, irrespective of variations in the power factor.

The sums of these selected speeds for the different power factors can be arranged successively so that a theoretical speed curve may be obtained, which is approximately constant regardless of the power factor changes, so long as the products of the other factors which govern the speeds of the meter elements, remain substantially unchanged.

In the present preferred practical embodiment of the invention, the predetermined speeds of the meter elements under changes in power factor, are transmitted through change gear mechanism to a single shaft. The speed of this shaft is consequently proportional to the energy output, and the time integral of this speed is proportional to the apparent consumption of energy. As the time integral of the speed can be expressed by the number of revolutions, it follows that the number of revolutions is a measure for the apparent consumption.

The following example of construction and practice will serve for further explanation. A single phase system is assumed. One of the two meter elements is a watt hour meter element, the other a reactive or wattless component meter element. It is not essential, so far as concerns the broader aspects of the invention, to use these two kinds of meter elements specified, but their use has the advantage, that not only the apparent consumption is determined and registered, but also the k. w. and reactive component consumption. It is furthermore assumed, that the speeds of the two meter elements change with the value of the power factor, or on a sine and cosine basis; that the maxima of the speeds of the meter elements are of the same value; and that current and voltage values remain constant. These assumed conditions are not absolutely necessary, but are assumed only, in order to simplify the example.

Fig. 1 shows illustrative component speed curves obtained by the apparatus of this invention, and Fig. 2 is a schematic representation of the apparatus employed.

Fig. 1 shows on the abscissa the phase angle $\Phi$ of the load on the line, and the power factor cosine $\Phi$, and on the ordinates the speed in percent is indicated. 1 is the speed curve of the watt hour meter element, 2 the speed curve of the reactive or wattless component meter element. Such speed curves will now be found, the sum or difference of which results in speed curves having amplitudes of the same value as the amplitude values of the meter speed curves, which occur at a phase angle of $22\frac{1}{2}°$, $45°$ and $67\frac{1}{2}°$, as exemplified in Fig. 1. The amplitudes of the speed components are indicated by $a\ \phi$ and $b\ \phi$ respectively, where $\phi$ is the phase angle corresponding to the maximum value of the collective speeds.

Hence:—

$$a\varphi \cdot \cos\varphi + b\varphi \cdot \cos(90-\varphi) = a_0 = b_0$$
$$a\varphi \cdot \cos\varphi + b\varphi \cdot \sin\varphi = a_0 = b_0$$
$$\frac{a\varphi}{a_0} \cdot \cos\varphi + \frac{b\varphi}{a_0} \cdot \sin\varphi = 1$$

Now,
$$\cos^2\varphi + \sin^2\varphi = 1$$
therefore
$$\frac{a\varphi}{a_0} = \cos\varphi \text{ and } \frac{b\varphi}{a_0} = \sin\varphi$$
or
$$a\varphi = a_0 \cos\varphi \text{ and } b\varphi = a_0 \sin\varphi$$

If we make $a_0 = 100\%$, $a\varphi$ and $b\varphi$ will be expressed as percentages of $a_0$.

$a\varphi = 100.a_0 \cos\varphi$ in per cent of $a_0$.
$b\varphi = 100.a_0 \sin\varphi$ in per cent of $a_0$.

The values of $a\varphi$ and $b\varphi$ can be readily obtained by putting in the particular values for $\varphi$. The following are examples where $\varphi = 22\frac{1}{2}°$.

$a\ 22\frac{1}{2}° = 0.9239 \times 100\% = 92.39\%$ of $a_0$.
$b\ 22\frac{1}{2}° = 0.3823 \times 100\% = 38.23\%$ of $a_0$.

The corresponding curves are 3 and 4, and 6 is the resultant.

The amplitudes of the speed curves whose resultant reaches its maximum value when $\varphi$ is 45° and 67½° may be calculated in the same manner. The curve of the highest speeds is in the form of a wavy line 5, 6, 7, 8, 9. As will be seen, the speed remains nearly constant, the value actually fluctuating between 100% and 98.08%. It is clear that by further subdividing the power factor ranges the fluctuations can be reduced indefinitely and practically any desired degree of accuracy can be obtained.

In order to transmit this partially subdivided speed curve to one and the same spindle, the arrangement illustrated in Fig. 2 is employed. In this drawing 10 represents the driving element of the watt-hour meter and 11 the driving element of the wattless component meter. These driving elements act directly on two counters 12 and 13 which register the watt consumption and wattless consumption respectively. By means of variable speed transmission gearing, 16, 17 and ratchet clutches 18, the spindles 14 and 15 act, either directly or through planet gearing 19, 20, 21, on a spindle 22, to which the equivalent value of the speed curve 5, 6, 7, 8, 9 is to be transmitted.

It is characteristic of both the sine and cosine functions that in the neighborhood of their maxima a fairly large change in the value of the phase angle effects only a minute alteration in the value of the function. Hence, in the neighborhood of unity power-factor a watt-hour meter will register very nearly the actual kvah. For instance, if the kwh. meter is accurate at unity power-factor, it will register 98.5 per cent of the true kvah. at 10° of phase displacement. Similarly, the reading of the reactive component meter at a phase displacement of between 80° and 90° will approximate very closely to the true reactive kvah.

Similarly various other points of angle difference may be selected, and from the speeds of the two meters at these selected points, speeds may be derived, the curves of which very gradually reach their maxima over a considerable range of phase angle change. Due to the characteristic already described, each of these derived speeds, through a corresponding selected maximum range of the speed curve and through the corresponding change in power factor, will indicate within the required degree of accuracy the kva. values. These various selected points in phase angle change may be selected sufficiently close together so as to provide successive derived speeds within the required range of accuracy of indication of the apparent consumption, and the corresponding segments of speed curves, taken along their intersecting segments of maximum range, will be a continuous composite curve, remaining within the required limit of accuracy, and these successive maximum speed ranges may be successively and selectively utilized to register or otherwise indicate within a required degree of accuracy the kvah. values. It is quite obvious that if these points be selected substantially symmetrically and of sufficient number, the resultant curve will approach the continuous kvah, values within any desired degree of accuracy.

Taking now the second selected degree of phase difference, namely 45°, by a like derivation, the speed of the watt-hour meter is represented by the curve 3' and the speed of the reactive component meter by the curve 4', and the sums of the ordinate values of these speeds by the curve 7. It will be noted that the maxima of the curve 7 through a phase angle difference of approximately 33⅓° to 55° falls within the required degree of accuracy of registration of the kva. values. In like manner, taking the third selected phase angle difference, or 67½°, the speed curves 3'' and 4'' represent respectively the desired derived speeds of the watt-hour meter and reactive component meter. In like manner, the speed curve 8 is derived therefrom, and the maxima thereof through a phase difference range of approximately 55° to 90° is utilized as approximating the true kva. values within the required degree of commercial accuracy.

It will be seen, therefore, that the final and composite curve 5, 6, 7, 8 and 9 represents functions of the respective speeds of the watthour meter and reactive component meter at selected points of phase angle difference, within certain ranges of their maxima, and very closely approximate the true kva. values, and that the greater number of points of phase differences which are utilized in deriving these curves, the more nearly is absolute representation of true kva. values effected. Furthermore, in practical operation, the error or deviation can be minimized by calibration corrections.

The desired results in registration of the kva. values is effected by my invention through the use of only two meters, preferably operating at a phase angle difference of 90°, and they are preferably though not necessarily a watt-hour meter and a reactive component meter, such as are preferably used in the preferred embodiment. There may be a less angle between the two meters if there is no need to register extremes of variation in power factor.

In constructing a mechanism to actually register or otherwise indicate the apparent consumption irrespective of power factor changes, a corresponding differential gear mechanism can be designed, with its sun wheels driven by the respective meters, to have at 22½° phase displacement the speeds represented by curves 3 and 4. The planetary will have a speed of one-half the sum of the two driven gears, and by doubling this speed by gearings, the new speed will be the sum of the speeds of the sun wheels, that is, its speed would be represented by the curve 6. A similar mechanism for 45° phase angle and another for 67½° phase angle could be similarly devised. The maxima of these would be represented respectively by curves 7 and 8.

The meters drive the register or other indicating device either directly from one of the meters or through one of the differential mechanisms, whereby the fastest moving driving mechanism will drive the register, as by pawl and ratchet drives, the speed of the register will be represented by the composite curve 5, 6, 7, 8, 9 of Fig. 1, and the registration will be the kva. within the required degree of accuracy.

In Fig. 2 of the drawings, a mechanism operating to effect a kva. registration corresponding to the composite curve 5, 6, 7, 8 and 9 of Fig. 1 is shown diagrammatically, the dot and dash lines indicating gears which actually mesh in the machine construction. The meter 10 drives the shaft 14, which has a gear 14$^a$ which meshes with a gear 18$^a$ loosely journaled on the shaft 22, and having a pawl 18$^b$, which engages with a ratchet wheel 18 fixed on the shaft 22. In like manner, the reactive component meter 11 drives the shaft 15, and fixed thereon is a gear 15$^a$, which meshes with a gear 17$^b$ loosely mounted on shaft 22, and carrying a pawl 17$^c$ which meshes with a ratchet wheel 18$^d$ fixed on the shaft 22.

Considering now the simple case of these two gear connections, their speed would be represented for those of meter 10 by the curve 1, and that of the meter 11 by the curve 2 of Fig. 1. It would be clear, further, that whichever meter ran more rapidly would drive the shaft 22, the ratchet wheel for the other meter slipping under its pawl. It would be clear, further, that at a phase angle of 45°, the deviation from accurate registration of the kva. values would be about 71 per cent.

In order to cut out the drive of the meter 10 above 10° and that of meter 11 below about 80° of phase angle difference, in the present preferred mechanical embodiment, a plurality of differential gear mechanisms are driven from the meters 10 and 11, and these are arranged to drive one another in series, each differential driving mechanism, however, having its own drive onto the shaft 22 of the kva. register 30, whereby it will drive the register 30 when the particular differential driving mechanism is running fastest, or in other words is at the speeds represented by the maximum range of its speed curve, as shown in Fig. 1.

In said embodiment, a gear wheel 22' is fixed on shaft 14, driven from meter 10, and meshes with one side of the first differential driving mechanism, which includes a sun wheel 24. In like manner, a gear-wheel 23 is fixed on shaft 15, driven from the meter 11, this gear-wheel meshing with the other side of the first differential driving mechanism which comprises a sun wheel 25. A planet gear 19 meshes with both sun wheels 24 and 25, and is journaled on an arm fixed to and rotating the shaft 26. Shaft 26 through a direction-reversing idler gear 26$^a$ drives a gear 26$^b$, which is in mesh with a gear 26$^e$ of a ratchet drive 27 similar to those already described, whereby the first differential drive, when it is running more rapidly than the others, may operate the kva. register 30.

When two sun-wheels are running in the same direction the inter-meshing and driven planetary rotates at a speed equal to one-half of the sum of the speeds of the two driving sun-wheels, and by proportioning gear 26$^b$ to drive loose gear 26$^e$ at a two-to-one ratio, shaft 22 will be driven at the sum of the speeds of sun-wheels 24 and 25, when that sum exceeds the speeds of any of the other alternative drives. This will occur at that range corresponding to the part of curve 6 which is also a part of the composite curve, representing kva. values, in Fig. 1.

In the mechanism as here embodied, the speed of sun-wheel 24 may be considered as represented by curve 3, the speed of sun-wheel 25 by curve 4, and the speed of ratchet gear 26$^e$ by curve 6 of Fig. 1. It will be seen, therefore, that for a corresponding range of power factor, as indicated in Fig. 1, gear 26ᵉ runs faster than any of the other gears, and will therefore drive the kva. register 30 during the part 6 of the composite curve at the top of Fig. 1.

In the second differential driving device, the construction and operation is similar. The sun-wheel 24ᵃ rotates proportionately to meter 10 and sun-wheel 25ᵃ rotates proportionately to meter 11, and the inter-meshing planet gear 20, and with it gear 20ᵇ rotates at half the sum of the speeds of sun-wheels 24ᵃ and 25ᵃ, and therefore of the meters 10 and 11. The gear 20ᵇ rotates ratchet gear 20ᵈ at a two-to-one ratio, and therefore gear 20ᵈ rotates at a speed equal to the sum of the speeds of the sun-wheels 24ᵃ and 25ᵃ. This ratchet will be driven fastest at speeds corresponding to the part 7 of the composite curve at the top of Fig. 1.

The third differential driving mechanism has sun wheels 24ᵇ and 25ᵇ and a planetary intermeshing gear 21, which drives through the direction reversing idler gear 21ᵃ, and through gear 21ᵇ onto the ratchet gear 21ᵈ. The speeds of the sun-wheels of this driving mechanism is represented by the speed curves 3″ and 4″, and this mechanism drives fastest at the speed corresponding to the part 8 of the composite curve at the top of Fig. 1.

It will be clear that with a mechanism as described, it is practicable to impart to shaft 22 the speed values of the maximal speed curves 5, 6, 7, 8, 9 of Fig. 1, and that the speed of this shaft will remain substantially constant, notwithstanding the variations of power factor under constant voltage and current, so that it can be employed to register the apparent consumption of volt amperes. A register 30 is conventionally shown connected to the shaft, to be driven thereby, for this purpose.

If it is only necessary to register the apparent consumption within certain power factor limits, or with a limited degree of accuracy, the planet gears may be omitted and the practically constant speed of the spindle 22 obtained by means of the ratchet clutch 18 only. Conversely, the direct transmission by the ratchet clutches 18, could be omitted and only planet gears employed for transmitting the speeds.

It will be understood that for polyphase circuits the two meters must be constructed according to the nature of the supply. It may, however, be mentioned that in three-phase, three-wire circuits the two wattmeter method can be employed without difficulty.

The invention in its broader aspects is not limited to the specific method, steps and mechanisms shown and described but departures may be made therefrom within the scope of the accompanying claims without departing from the principles of the invention and without sacrificing its chief advantages.

What I wish to secure by U. S. Letters Patent is:—

1. A mechanism for measuring the apparent energy consumption from an alternating current circuit which comprises a plurality of meters, having different phase angles between the active current and pressure fields, means for registering the apparent energy consumption, and alternatively operating connections between the meters and registering mechanism for driving the registering means at a speed equivalent to the algebraic sum of the speeds of the meters, for registering the apparent energy consumption irrespective of variations in the power factor.

2. A mechanism for measuring the apparent energy consumption from an alternating current circuit which comprises a watt hour meter, a wattless component meter, means for registering the apparent energy consumption, and alternatively operating connections between the meters and registering mechanism, for driving the registering means at a speed equivalent to the algebraic sum of the speeds of the meters, for registering the apparent energy consumption irrespective of variations in the power factor.

3. A mechanism for measuring the apparent energy consumption from an alternating current circuit which comprises a plurality of meters, having different phase angles between the active current and pressure fields, means for registering the apparent energy consumption, and alternatively operating connections between the meters and registering mechanism, for driving the registering means at the speed of either meter, or at the algebraic sum of their speeds, as the power factor varies, for registering the apparent energy consumption irrespective of variations in the power factor.

4. A mechanism for measuring the apparent energy consumption from an alternating current circuit which comprises a watt hour meter, a wattless component meter, means for registering the apparent energy consumption and alternatively operating connections between the meters and registering mechanism, for driving the registering means at the speed of either meter, or at the algebraic sum of their speeds, as the power factor varies, for registering the apparent energy consumption irrespective of variations in the power factor.

5. The method of measuring the apparent energy consumption in an alternating current circuit which comprises employing cooperatively a plurality of meters which have respectively variant phase angles between their active current and pressure fields, and having predetermined speed interrelation such that the algebraic sum of their speeds will be substantially constant irrespective of variations in the power factor, and conjointly registering the revolutions of the plurality of meters to effect the registered measurement of the apparent consumption irrespective of variations in the power factor.

6. The method of measuring the apparent energy consumption in an alternating current circuit which comprises employing cooperatively a watt hour meter and a wattless component meter, which have respectively variant phase angles between their active current and pressure fields, and having predetermined speed interrelation such that the algebraic sum of their speeds will be substantially constant irrespective of variations in the power factor, and conjointly registering the revolutions of the plurality of meters to effect the registered measurement of the apparent consumption irrespective of variations in the power factor.

7. A mechanism for measuring the apparent energy consumption in an alternating current circuit which comprises two meters, having different phase angles between the active current and pressure fields, means for registering the apparent energy consumption, and connections between the two meters and the registering means to drive the registering means at a speed equivalent to the algebraic sum of the speeds of the two meters to register the apparent energy consumption irrespective of variations in the power factor.

8. The method of measuring the apparent energy consumption in an alternating current circuit which comprises employing cooperatively two meters which have respectively variant phase angles between their active current and pressure fields, and having predetermined speed interrelation such that the algebraic sum of their speeds will be substantially constant irrespective of variations in the power factor, and conjointly registering the revolutions of the two meters to effect the registered measurement of the apparent consumption irrespective of variations in the power factor.

9. A mechanism for measuring the apparent energy in an alternating current circuit, including in combination a plurality of meters, a register, and a plurality of differential gear mechanisms in mesh with each of said meters, the high speeds of all said gear mechanisms being substantially equal but occurring at different power factors, and connections whereby any of said gear mechanisms will drive the register while running at higher speed than the other gear mechanisms.

10. A mechanism for measuring the apparent energy in an alternating current circuit, including in combination a plurality of meters, a register, and a plurality of differential gear mechanisms in mesh with each of said meters, the high speeds of all said gear mechanisms being substantially equal but occurring at different power factors, and connections whereby any of said gear mechanisms will drive the register while running at higher speed than the other gear mechanisms and an independent drive from a meter to said register and a connection whereby it will drive the register when running at higher speed than said differential gear mechanisms.

11. A mechanism for measuring the apparent energy in an alternating current circuit, including in combination a watt hour meter, a reactive component meter, a register, gear connections whereby the watt hour meter at unity power factor and the reactive component meter at zero power factor will drive the register at a predetermined speed, gear mechanism connected to be driven jointly by said meters to alternatively drive said register at said predetermined speed at an intervening value of power factor.

12. A mechanism for measuring the apparent energy in an alternating current circuit, including in combination a plurality of meters adapted to run at different speeds at any given value of power factor, a register, a differential gearing having a sun wheel in mesh with one of said meters, a sun wheel in mesh with another of said meters, an intermeshing planetary gear and a drive from said planetary gear to said register.

13. A mechanism for measuring the apparent energy in an alternating current circuit, including in combination a plurality of meters adapted to run at different speeds at any given value of power factor, a register, a differential gearing having a sun wheel in mesh with one of said meters, a sun wheel in mesh with another of said meters, an intermeshing planetary gear and a drive from said planetary gear to said register including a pawl and ratchet wheel.

14. A mechanism for measuring the apparent energy consumption in alternating current circuits including in combination a plurality of meters, a register, a plurality of gear mechanisms driven jointly by said meters and selectively driving said register, said various gear mechanisms having equal maximum speeds, but the various gear mechanisms reaching their maximum speeds at different phase angles.

15. A mechanism for measuring the apparent energy consumption in alternating current circuits including in combination a plurality of meters, a register, gearing from each meter to drive said register, gearing driven jointly by said meters, and connections whereby the fastest moving gearing will alternatively drive said register.

16. A mechanism for measuring apparent energy consumption including in combination a plurality of meters, a plurality of differential gear mechanisms driven by said meters, a register for apparent energy consumption, gearing connecting said register and said meters, gearing connecting said register and said differential gear mechanisms and clutches in said gearing whereby the register is driven by the gearing running at the greatest speed.

17. A mechanism for measuring apparent energy consumption in an alternating current circuit including in combination a plurality of rotatable meter elements, a register for apparent energy consumption, gearing directly coupling said meter elements and register, gearing for combining the speed of rotation of said meter elements and transmitting it to the register and clutch means selectively to drive the register from a single gearing.

18. A mechanism for measuring apparent energy consumption including in combination a plurality of meters, a register, a plurality of change-speed gear mechanisms in mesh with each of said meters, the speed produced by each of said gear mechanisms being substantially equal for each rate of consumption of apparent energy but occurring at different power factors, and connections whereby the fastest running of said gear mechanisms will drive said register.

19. A mechanism for measuring apparent energy consumption including in combination a plurality of meters, a register, means for independently driving the register from each of said meters, means connected to both of said meters for driving the register, and means whereby the power factor determines which driving means will drive the register.

20. A mechanism for measuring apparent energy consumption including in combination a plurality of meters, a register, means for driving the register from each of said meters, means for simultaneously driving the register from both meters, and means for operatively connecting the register to the driving means the speed of which most nearly represents the rate of apparent energy consumption.

21. A mechanism for measuring apparent energy consumption including in combination a watthour meter, a meter for wattless component, a register, means for independently driving the register by either meter, means for simultaneously driving the register by both meters, and means controlled by the power factor for selecting the driving means for the register.

In witness whereof I affix my signature.

RICCARD PUDELKO.